3,679,515
SELF-BONDED TISSUE-FIBER LAMINATE
PROCESS
A. Earl Capell, Hendersonville, N.C., and Leroy E. Wilson, Appleton, Wis., assignors to Kimberly-Clark Corporation, Neenah, Wis.
No Drawing. Filed Sept. 3, 1969, Ser. No. 855,017
Int. Cl. C09j 5/06
U.S. Cl. 156—309
5 Claims

ABSTRACT OF THE DISCLOSURE

A process for joining independent fabric structures comprised of a web of light weight creped cellulose wadding, a layer of oriented fibers, and an intermediate layer of substantially cured, thermoplastic adhesive. The process comprises (1) preparing a laminate consisting essentially of at least two fabric structures positioned such that a portion of the cellulose webs of each of the structures are in overlapping contact, (2) while, maintaining the laminate at a temperature of at least 300° F., applying pressure to the laminate to cause a portion of the intermediate layer of substantially cured, thermoplastic adhesive in each of said structures to flow through its own cellulose web and into and through the cellulose web of the structure in contact therewith, and (3) cooling the laminate.

DESCRIPTION OF THE INVENTION

This invention relates generally to joining independent pieces of nonwoven fabrics and more particularly concerns joining independent pieces of nonwoven fabrics each of which fabrics comprise a web of cellulose wadding, an overlying web of oriented fibers, and an intermediate layer of a substantially cured, thermoplastic adhesive.

Sokolowski (U.S. Pat. 3,327,708, issued on July 27, 1967) describes a method whereby light-weight webs of drafted fibers, i.e., fibers which are substantially aligned and fully extended, can be fashioned into useful fabric structures. As therein described useful structures are prepared by bonding a layer of drafted fibers to a web of cellulosic wadding which contains a thermoplastic adhesive. Subsequent improvements relating to the Sokolowski invention are described in U.S. applications, Ser. No. 546,067, filed Apr. 28, 1966, now U.S. Pat. No. 3,484,-330, and Ser. No. 551,605, filed May 20, 1966, now U.S. Pat. No. 3,553,064. These applications concern the preparation of nonwoven fabrics wherein several structures such as described by Sokolowski are bonded together with the fiber layers in face to face contact. Consequently, these applications described fabrics which comprise outer plies of cellulose wadding and inner layers of drafted fibers.

Sokolowski's fabrics, as well as the above mentioned improvements thereon, have proven to be quite useful in many different end use applications where disposable materials are desired, e.g., linens, toweling, diapers, etc. Since the fabrics are ordinarily prepared in standard widths and thereafter cut to appropriate sizes for the particular end use application, significant fabric waste will occur in the absence of a satisfactory method of joining together independent nonwoven fabric pieces. Customary joining techniques, involving an independent adhesive application, are generally unsatisfactory from a performance viewpoint or are economically unattractive due to need for additional adhesive application processing steps. Accordingly, it is an object of the present invention to provide an economically attractive method for securely joining together independent nonwoven fabric pieces such as disclosed by Sokolowski and related cases.

In accordance with the present invention there is provided a process for joining independent fabric structures, each of said structures comprised of a web of light-weight creped cellulose wadding, a layer of oriented fibers, and an intermediate layer of substantially cured, thermoplastic adhesive. The present process comprises (1) preparing a laminate consisting essentially of at least two of the above structures positioned such that a portion of the cellulose webs of each of the structures are in overlapping contact, (2), while maintaining the laminate at a temperature of at least 300° F., applying pressure to the laminate to cause a portion of the intermediate layer of substantially cured, thermoplastic adhesive in each of said structures to flow through its own cellulose web and into and through the cellulose web of the structure in contact therewith, and (3) cooling the laminate.

The individual fabric structures joined together by the present process comprise, in combination, a web of light-weight cellulose wadding, a layer of oriented fibers, and an intermediate layer of a substantially cured, thermoplastic adhesive. Such structures are hereinafter referred to as cellulose web-oriented fiber structures. As indicated earlier, suitable structures are illustrated in U.S. Pat. 3,327,708 and in Ser. Nos. 546,067 (now U.S. Pat. No. 3,484,330) and 551,605 (now U.S. Pat. No. 3,553,064). In particular, the structures described in the latter applications are especially suitable for use herein since they exhibit surprisingly good dimensional stability. These structures basically comprise top and bottom webs of cellulose wadding, inner layers of drafted fibers, and intermediate layers of substantially cured, thermoplastic adhesive disposed substantially between each cellulose web and its adjacent fiber layer. In such structures, the drafted fiber layers are in face to face contact. Structures containing layers of oriented fibers other than those prepared by drafting can also be used so long as the recited structure elements, i.e., the cellulose web, the oriented fiber layer, and the thermoplastic adhesive, are present in the appropriate relationship.

The individual cellulose web-oriented fiber structures useful in the present process are ordinarily prepared by bringing an oriented fiber layer into contact with a cellulose web which contains, on the contacting surface thereof, a thermoplastic adhesive. Subsequent hot calendering can be used to secure adhesion between the fiber layer and the cellulose web. Similarly, where the individual cellulose web-oriented fiber structures comprises top and bottom webs of cellulose wadding and inner layers of oriented fibers in face to face contact, hot calendering of two structures containing single cellulose wadding and fiber layers is useful. In preparing the structures the thermoplastic adhesive is ordinarily deposited on the cellulose web in a spaced pattern. By doing such, the flexibility of the structure is maintained.

Useful thermoplastic adhesives include those which can be easily applied and rapidly cured at an elevated temperature. After curing, the adhesive should be soft and flexible and be capable of plastic flow on heating. Plastisols are particularly useful adhesives, especially those containing vinyl chloride polymers and copolymers and organic phthalate, sebacate, adipate, or phosphate plasticizers.

The present process is accomplished by bringing at least two cellulose web-oriented fiber structures into overlapping contact in such a manner that a portion of the cellulose web surfaces of the individual structures are together. The overlapped portion of the structures is herein referred to as the laminated segment. Subsequent joining of the structures occurs over the area of contact and the adhesive joint is substantially uniform. As such, the present process represents an improvement over a process involving an independent adhesive application. In such latter instances, unless very precise control is exercised, the adhesive joint is rarely uniform resulting in flapping edge segments, and frequently the applied adhesive is forced beyond the area of contact, a result which is both wasteful and unattractive. The magnitude of the area of contact between the structures to be joined is not particularly limited; generally an overlap of about 0.5–1.5 inches is practical.

Once the structures have been brought into overlapping contact, the laminated segment is subjected to pressure while being maintained at a temperature of at least 300° F. Such a minimum temperature is necessary in order to achieve sufficient adhesive flow during pressure application. While it is desirable to use temperatures higher than 300° F. in order to enhance the adhesive flow, the temperature should not be so high as to deleteriously affect either the oriented fibers or the cellulose web. In general, preferred temperatures for use with the cured, thermoplastic adhesives disclosed in the above mentioned patent and applications (e.g., vinyl chloride plastisols) are about 350° F.–450° F. However, as hereinafter explained, the appropriate temperature is related to the pressure applied during bonding.

Sufficient pressure must be applied to the laminated segment to cause adhesive in each individual cellulose web-oriented fiber structure to flow through its own cellulose web and into and through the contacting cellulose web. Since ease of adhesive flow is temperature dependent, less pressure is required at high temperatures. At about the minimum temperature of 300° F., a pressure of about at least 1500 p.s.i. is required to obtain an acceptable joint. On the other hand at higher temperatures, e.g., 350° F.–450° F., pressures as low as about 900 p.s.i. can be used. The upper limit on pressure is not particularly critical so long as the fiber structures are not crushed. For practical purposes when using the above recited preferred temperatures, pressures on the order of about 1000–4000 p.s.i. are most useful.

Preferably, the present process is accomplished by passing two cellulose web-oriented fiber structures in the desired overlapped position through the nip of heated calender rolls. The structures can be pre-heated prior to such operation. Frequently, the same calender rolls used in forming the original structures can be used in forming the joint, the added thickness of the laminated segment giving rise to the pressure necessary to cause sufficient adhesive flow. When operating at temperatures of about 350° F.–450° F., the conveying speed is not particularly critical and speeds as high as 300 f.p.m. can be used. At lower temperatures, the speed should not exceed that which allows for sufficient flow while the laminated segment is under pressure.

The following table illustrates the tensile strength performance of joined structures prepared by the present process. Tensile results were obtained using an Instron machine with a crosshead speed of 20 inches per minute. The individual fabric structures joined were cross-laid cellulose web-drafted fiber structures similar to the samples tested in Ser. No. 546,067 (now U.S. Pat. No. 3,484,330). Joints were made with an overlap of 0.5 inch between heated platens at the indicated temperatures and pressures. The contact time was about 2–3 seconds. Tensile performance is reported as a percentage of the tensile strength, similarly measured, of one of the cross-laid cellulose web-drafted fiber structures itself.

| Sample | Temperature (° F.) | Pressure (p.s.i.) | Tensile performance (90) |
|---|---|---|---|
| 1 | 325 | 830 | 88 |
| 2 | 325 | 1,250 | 86 |
| 3 | 325 | 2,100 | 105 |
| 4 | 325 | 3,300 | 115 |
| 5 | 350 | 1,250 | 98 |
| 6 | 350 | 2,100 | 117 |
| 7 | 350 | 3,300 | 94 |
| 8 | 400 | 1,250 | 105 |
| 9 | 400 | 2,100 | 110 |
| 10 | 400 | 3,300 | 120 |

In practice, joined fabrics possessing joint strengths comparable to those illustrated above can be prepared by passing continuous lengths of overlapped structures through calender rolls heated to 370° F. The roll clearance is set so as to exert about 700 p.l.i. pressure on the laminated segment. In combination with pre-heat rolls at about 310° F., conveying speeds of up to about 200 f.p.m. can be used. By means of such a process, otherwise waste fabric can be economically fashioned into useful widths for subsequent utilization. Similarly, standard width fabric pieces can also be joined where extraordinarily wide fabrics are required. Since the joint prepared by the present process has been formed without an externally applied adhesive, it is neat in appearance and quite uniform.

We claim:

1. A process for joining independent fabric structures each of which comprises a web of light-weight cellulose wadding, a layer of oriented fibers, and an intermediate layer of substantially cured, thermoplastic adhesive which secures the cellulose wadding to the layer of oriented fibers, said process comprising (1) preparing a laminated segment between at least two of said structures by positioning said structures such that a portion of the cellulose webs of each of the structures are in overlapping contact, (2) while maintaining the laminated segment at a temperature of at least 300° F., applying pressure thereto to cause a portion of the intermediate layer of substantially cured thermoplastic adhesive in each of said structures to uniformly flow substantially within the area of overlapping contact through its own cellulose web and into and through the cellulose web of the structure in contact therewith, and (3) cooling the laminated segment.

2. The process of claim 1 wherein the fabric structures comprise top and bottom webs of cellulose wadding, inner layers of oriented fibers, and intermediate layers of substantially cured, thermoplastic adhesive, disposed in a spaced pattern, between each cellulose web and its adjacent fiber layer.

3. The process of claim 2 wherein, during pressure application, the laminate is maintained at 350° F.–450° F.

4. The process of claim 1 wherein the fabric structures comprise top and bottom webs of cellulose wadding, inner layers of drafted fibers, and intermediate layers of substantially cured, thermoplastic adhesive disposed in a spaced pattern, between each cellulose web and its adjacent fiber layer.

5. The process of claim 4 wherein, during pressure application, the laminate is maintained at 350° F.–450° F.

References Cited
UNITED STATES PATENTS 3,416,984   12/1968   Chavannes et al. ___ 156—311 X
3,442,740   5/1969   David _____ 156—311 X

FOREIGN PATENTS 993,726   6/1965   Great Britain _____ 156—311

LELAND A. SEBASTIAN, Primary Examiner

U.S. Cl. X.R.

156—179, 311; 161—156